(12) United States Patent
Morris

(10) Patent No.: US 7,988,173 B2
(45) Date of Patent: Aug. 2, 2011

(54) BICYCLE SUSPENSION SYSTEM

(75) Inventor: Matthew Morris, Chicago, IL (US)

(73) Assignee: SRAM, LLC, Chicago, IL (US)

( * ) Notice: Subject to any disclaimer, the term of this patent is extended or adjusted under 35 U.S.C. 154(b) by 0 days.

(21) Appl. No.: 12/205,318

(22) Filed: Sep. 5, 2008

(65) Prior Publication Data

US 2010/0059964 A1 Mar. 11, 2010

(51) Int. Cl.
*B62K 21/02* (2006.01)
(52) U.S. Cl. .................... 280/276; 280/279; 280/280
(58) Field of Classification Search .............. None
See application file for complete search history.

(56) References Cited

U.S. PATENT DOCUMENTS

| | | | |
|---|---|---|---|
| 4,052,088 A | 10/1977 | Nicholls | |
| 4,159,105 A | 6/1979 | Vander Laan et al. | |
| 4,582,343 A * | 4/1986 | Waugh | 280/284 |
| 4,830,395 A * | 5/1989 | Foley | 280/124.162 |
| 4,838,771 A * | 6/1989 | Kikuchi | 417/417 |
| 5,348,112 A | 9/1994 | Vaillancourt | |
| 5,533,586 A * | 7/1996 | Thompson | 180/193 |
| 5,664,649 A * | 9/1997 | Thompson et al. | 188/314 |
| 6,044,940 A | 4/2000 | Marzocchi et al. | |
| 6,357,546 B1 * | 3/2002 | Crosby, Jr. | 180/227 |
| 6,688,626 B2 * | 2/2004 | Felsl et al. | 280/275 |
| 7,252,624 B2 * | 8/2007 | Wu et al. | 482/54 |
| 7,255,359 B2 * | 8/2007 | Felsl et al. | 280/279 |
| 7,270,211 B1 * | 9/2007 | Jones | 180/219 |
| 7,641,028 B2 * | 1/2010 | Fox | 188/299.1 |

FOREIGN PATENT DOCUMENTS

DE 295 08 612 U1 8/1995

* cited by examiner

*Primary Examiner* — Paul N Dickson
*Assistant Examiner* — Marlon Arce
(74) *Attorney, Agent, or Firm* — Milan Milosevic; Lisa Serdynski; Steven Courtright

(57) ABSTRACT

A bicycle suspension system of the present invention generally includes a bicycle suspension and a hydraulic control assembly. The hydraulic control assembly includes a fluid pump, a fluid responder and a fluid path. The fluid pump is mountable to a bicycle handlebar. The fluid responder is mountable to the bicycle suspension. The fluid path links the fluid pump and the fluid responder. The fluid responder is operatively connected to the bicycle suspension to operate the bicycle suspension between first and second suspension settings in response to fluid displacement between the fluid pump and the fluid responder.

2 Claims, 8 Drawing Sheets

BICYCLE SUSPENSION SYSTEM

BACKGROUND OF THE INVENTION

The present invention relates to bicycle suspension systems and more particularly to a bicycle suspension system including a hydraulic control assembly to operate a bicycle suspension between first and second suspension settings.

SUMMARY OF THE INVENTION

The present invention provides a bicycle suspension system generally including a bicycle suspension and a hydraulic control assembly. The hydraulic control assembly includes a fluid pump, a fluid responder and a fluid path therebetween. The fluid pump is mountable to a bicycle handlebar. The fluid responder is mountable to the bicycle suspension. The fluid path links the fluid pump and the fluid responder. The fluid responder is operatively connected to the bicycle suspension to operate the bicycle suspension between the first and second suspension settings in response to fluid displacement between the fluid pump and the fluid responder.

In one embodiment of the present invention, the fluid path includes a flexible connector between the fluid pump and the fluid responder. The bicycle suspension includes a damping system wherein the fluid path is discontiguous from the damping system. The fluid pump includes a first housing having a first fluid cavity, a first piston slidably disposed in the fluid cavity and a first actuator operatively connected to the first piston for displacing the first piston within the first fluid cavity. The first actuator and the first housing include a push-push toggle mechanism. The fluid responder includes a second housing having a second fluid cavity, a second piston slidably disposed in the second fluid cavity and a second actuator operatively connected to the second piston for operating the bicycle suspension in response to displacement of the second piston within the second fluid cavity. In addition to the flexible connector, the fluid path also includes the first and second fluid cavities.

These and other features of the present invention will be more fully understood from the following description of one or more embodiments of the invention, taken together with the accompanying drawings.

DETAILED DESCRIPTION

Figure 1:
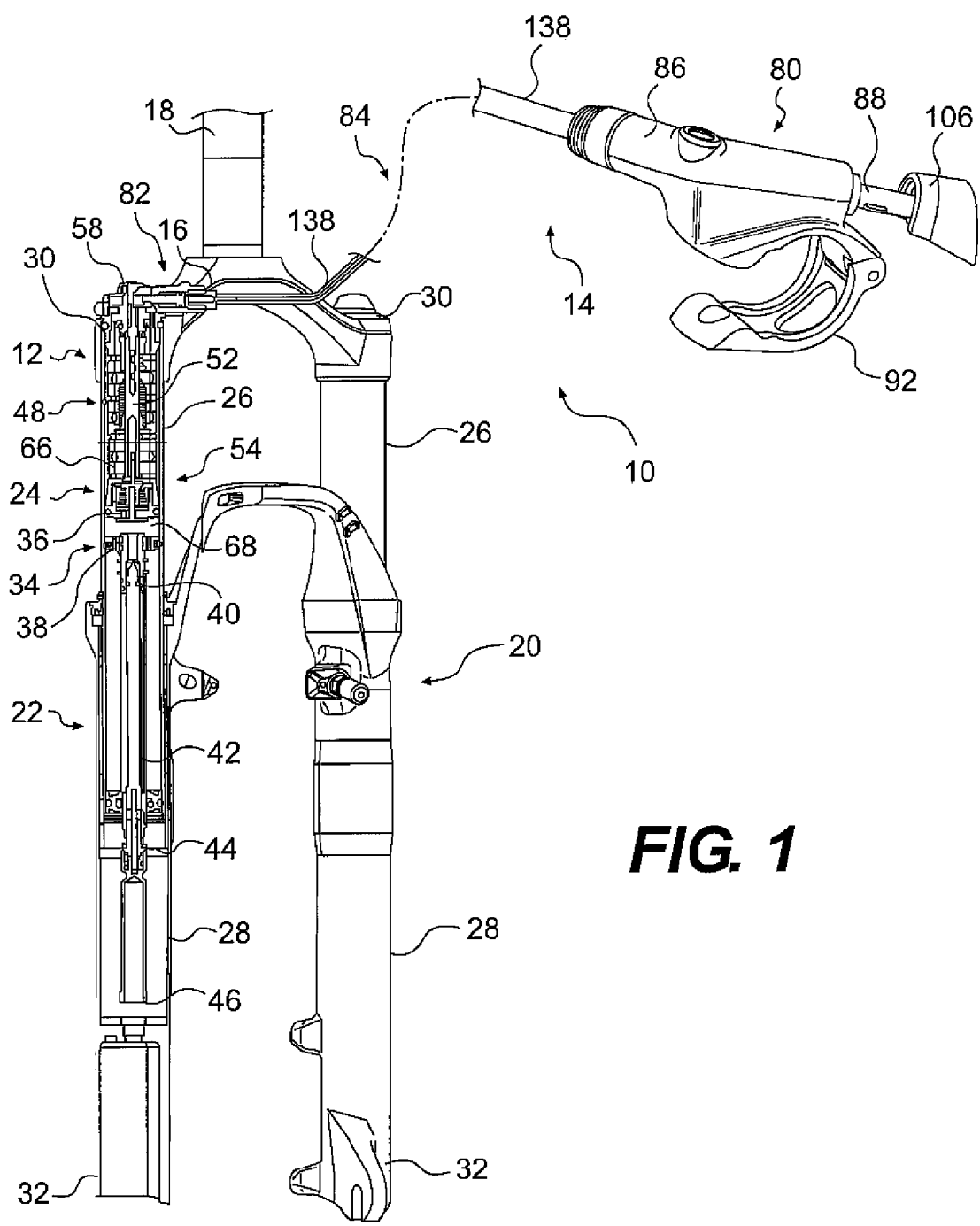
FIG. 1 is a partial cross-sectional perspective view of a bicycle suspension system according to one embodiment of the present invention.
Figure 2:
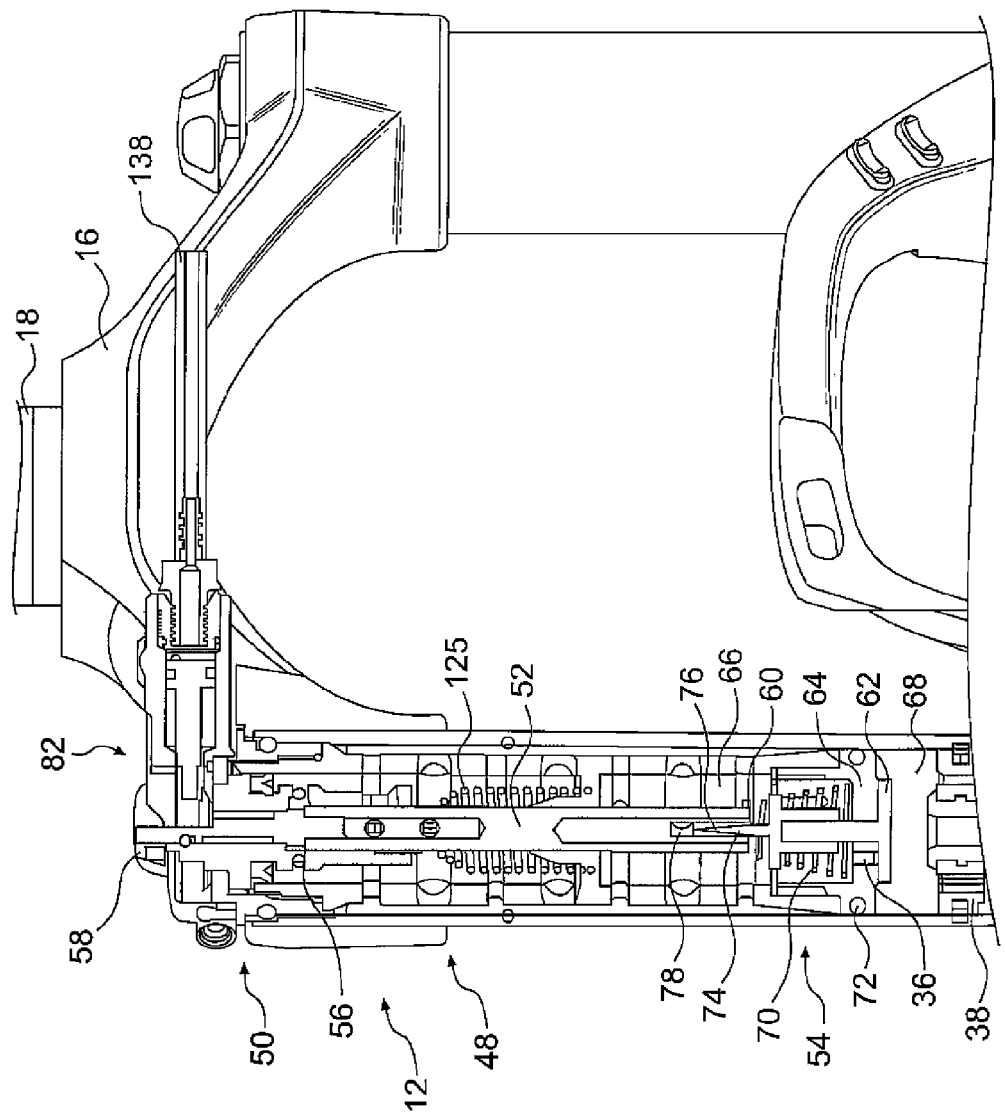
FIG. 2 is an enlarged portion of the bicycle suspension system of FIG. 1.
Figure 3:
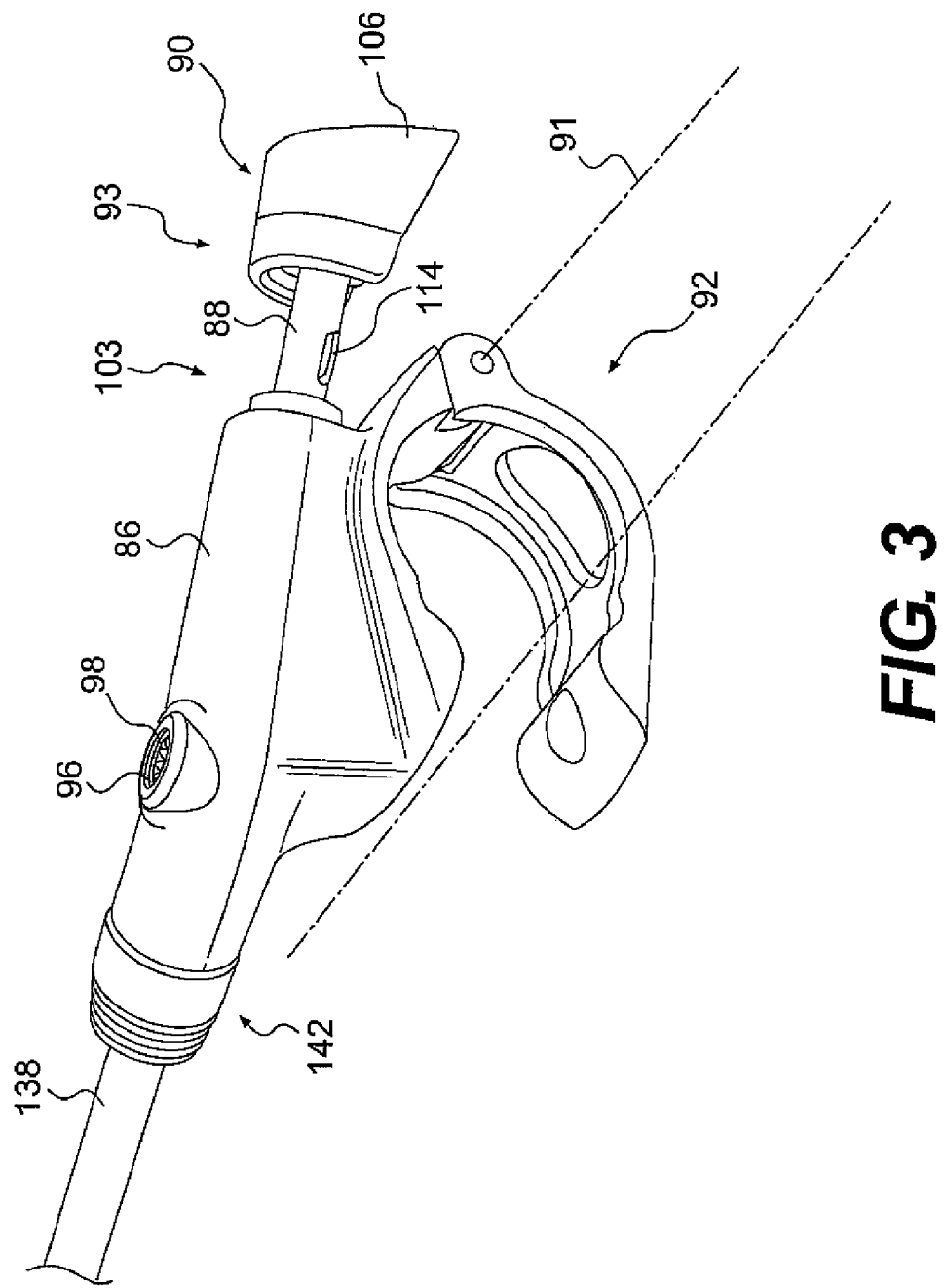
FIG. 3 is a perspective view of a fluid pump of the bicycle suspension system of FIG. 1.
Figure 4:
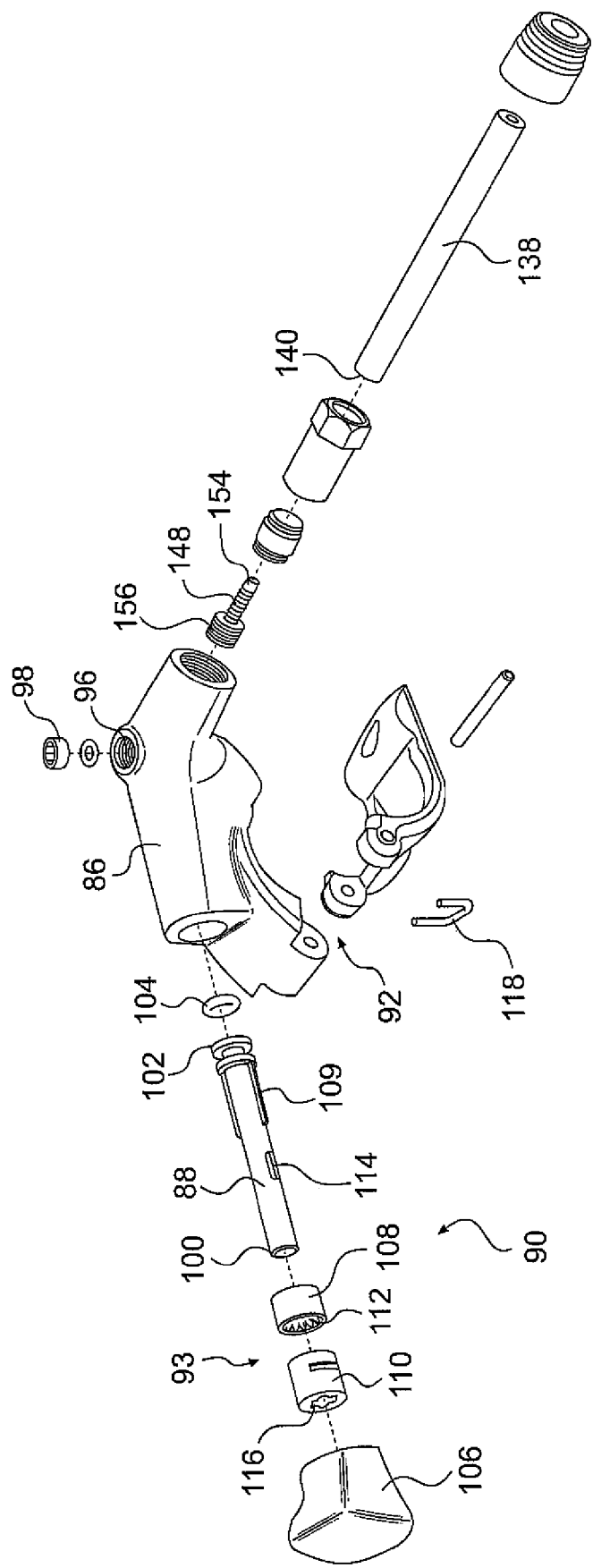
FIG. 4 is an exploded view of the fluid pump of FIG. 3.
Figure 5:
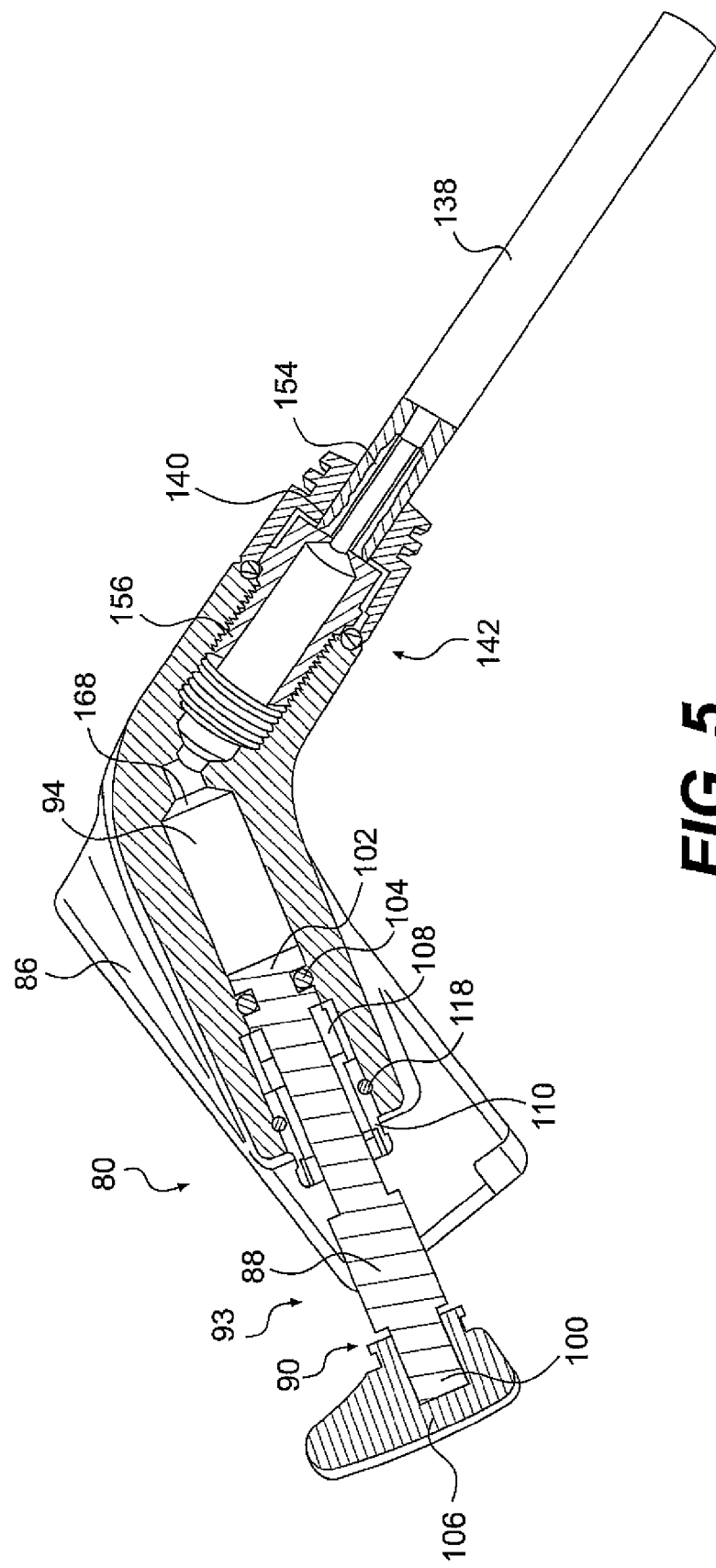
FIG. 5 is a cross-sectional view of the fluid pump of FIGS. 3 and 4.

FIGS. 1-8 illustrate a bicycle suspension system 10 according to one embodiment of the present invention. The bicycle suspension system 10 generally includes a bicycle suspension 12 and a hydraulic control assembly 14 for operating the bicycle suspension 12 between first and second suspension settings. Looking to FIGS. 1 and 2, the bicycle suspension 12 is a bicycle front suspension fork having a crown 16 that is connected to a steerer tube 18, a first leg 20 that may contain a biasing mechanism or spring assembly, and a second leg 22 that contains a damping assembly 24. Each of the legs 20, 22 includes an inner tube 26 and an outer tube 28 slidably displaceable relative to each other. The inner and outer tubes 26, 28 are connected at their upper ends 30 to the crown 16 and to a wheel axle (not shown) at lower ends 32, respectively. It is to be understood that although the present invention is described with respect to a front suspension fork, the bicycle suspension may be also be embodied in a rear shock, a seat post, or in similar applications on a bicycle frame.

The damping assembly 24 includes a compression piston assembly 34 that slides within the inner tube 26 during compression and rebound of the suspension, and an orifice 36 through which fluid restrictively passes to dampen fork displacement in response to an applied load. The compression piston assembly 34 includes a piston 38 that is attached to a first end 40 of a piston rod 42. The piston rod 42 extends through an end 44 of the inner tube 26 and has a second end 46 that is nonrotatably mounted to the outer tube 28.

The bicycle suspension 12 includes a lockout mechanism 48 for adjusting the suspension 12 between being a substantially rigid setting, the first suspension setting, and a substantially compressible setting, the second suspension setting. Alternatively, the suspension 12 may be adjusted between two or more substantially compressible settings. The lockout mechanism 48 includes a valve actuating assembly 50 that has a driver 52 that is rotated to open and close a valve mechanism 54. The driver 52 has a first end 56 rotatably connected to the hydraulic control assembly 14 and a manual knob 58, and a second end 60 rotatably connected to the valve mechanism 54.

The valve mechanism 54 includes a valve 62 and a valve seat 64 disposed in the inner tube 26, the valve mechanism 54 dividing the inner tube 26 into first and second fluid chambers 66, 68. The orifice 36 extends through the valve seat 64 to allow fluid flow between the chambers 66, 68. The valve 62 is operable between an open position, which opens the orifice 36 to permit fluid flow between the chambers 66, 68, and a closed position, which closes the orifice 36 to prevent fluid flow between the chambers 66, 68. The valve 62 is biased toward the closed position by a valve spring 70. An O-ring 72 about the valve seat 64 provides a seal between the first and second fluid chambers 66, 68. The valve 62 includes a valve stem 74 that extends through the valve seat 64 into the first fluid chamber 66. An end 76 of the valve stem 74 is received in a slot 78 of the driver 52. Upon rotation of the driver 52, the valve 62 rotates to open or close the orifice 36 depending on the direction of rotation.

The hydraulic control assembly 14 generally includes a fluid pump 80, a fluid responder 82 and a fluid path 84 linking the fluid pump and the fluid responder. Looking to FIGS. 3-5, the fluid pump 80 includes a first housing 86, a first piston 88, and a first actuator 90. The first housing 86 is mountable to a bicycle handlebar 91 by a clamp 92. Although the clamp 92 is shown as being integral with the first housing 86, alternatively, it may be discrete from the first housing 86. The first housing 86 includes a first fluid cavity 94 for receiving the first piston 88 slidably disposed therein and a first fill hole 96 for inserting fluid into the first fluid cavity 94. A sealing screw 98 is threaded into the first fill hole 96.

The first piston 88 includes first and second ends 100, 102. The first piston 88 is slidably displaceable between a first position and a second position. The first position may correspond to a substantially compressible suspension setting and the second position may correspond to a substantially rigid suspension setting. The first end 100 of the first piston 88 is connected to the first actuator 90 and the second end 102 includes an O-ring 104 to sealably connect the second end 102 of the piston 88 to the first housing 86.

The first actuator 90 includes a push-push toggle mechanism 93 including a push-button 106, a locking element 108 and a retaining element 110. The push-button 106 is connected to the first end 100 of the first piston 88. The locking element 108 is configured to receive the first piston 88 and includes a plurality of ridges 112 on an inner surface of the locking element 108 for releasably engaging with a plurality of projections 114 on an outer surface of the first piston 88. As the first piston 88 is displaced, by pushing the push-button 106, the projections 114 of the first piston releasably engage the ridges 112 of the locking element 108, rotating the locking element 108 into a locked position against the stop projections 109 on the outer surface of the first piston 88. The retaining element 108 is also configured to receive the first piston 88 for maintaining the locking element 108 in an axially fixed position. The retaining element 110 includes a plurality of anti-rotation features 116 for matingly engaging with the projections 114 on the first piston 88 to prevent rotation of the retaining element 110. A U-shaped pin 118 secures the retaining element 110 to the first housing 86.

Figure 6:
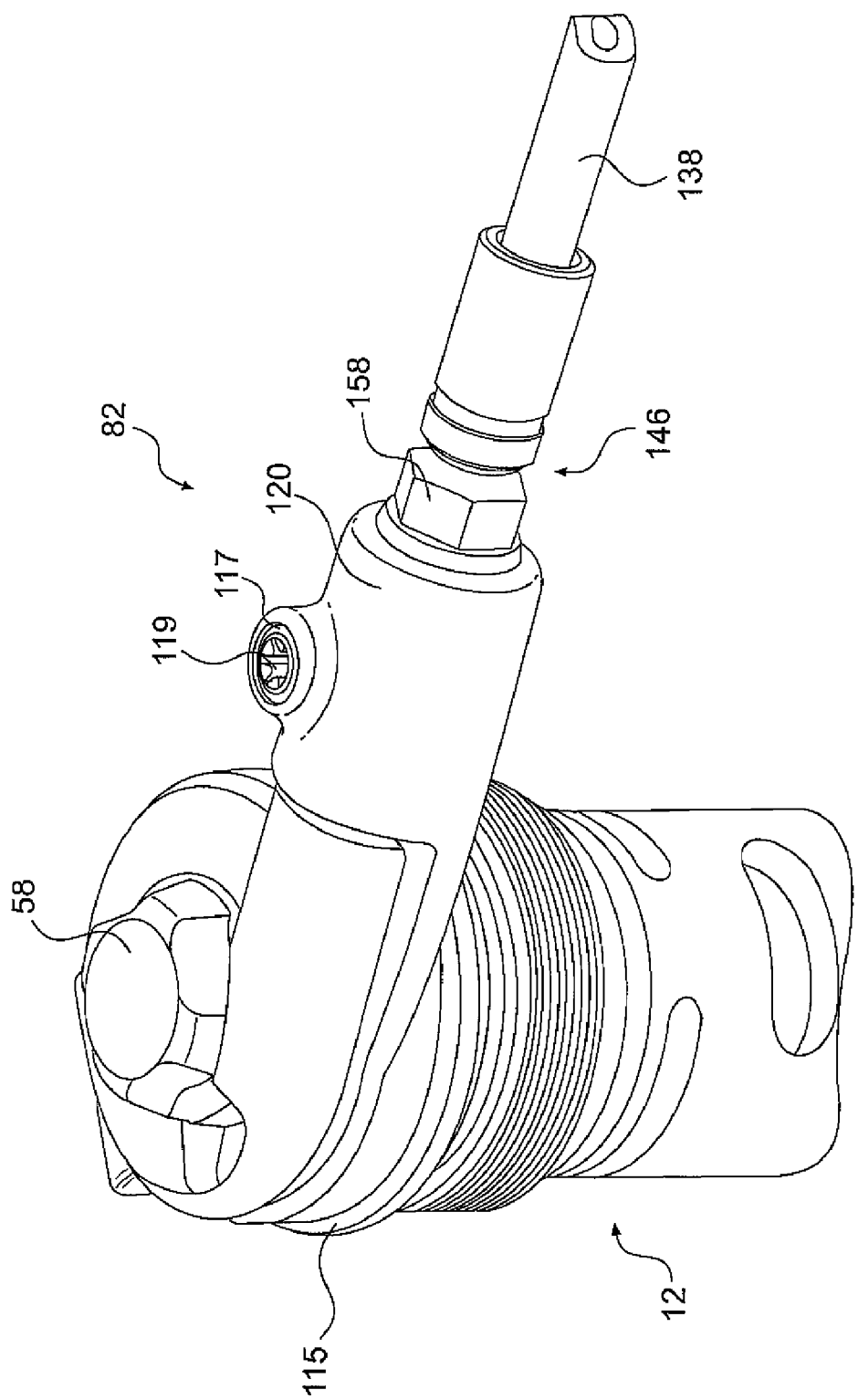
FIG. 6 is a perspective view of a fluid responder of the bicycle suspension system of FIG. 1.
Figure 7:
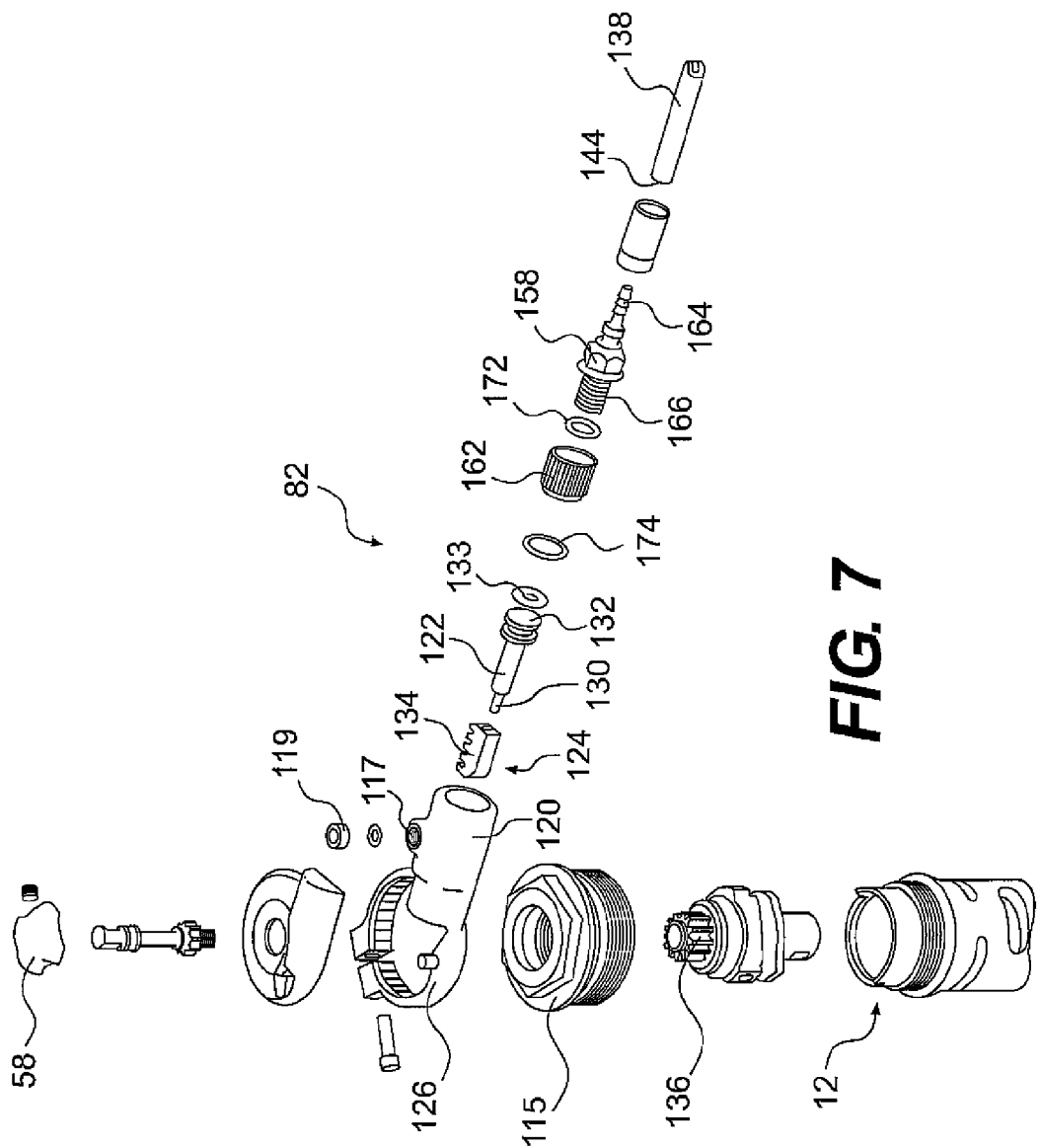
FIG. 7 is an exploded view of the fluid responder of FIG. 6.
Figure 8:
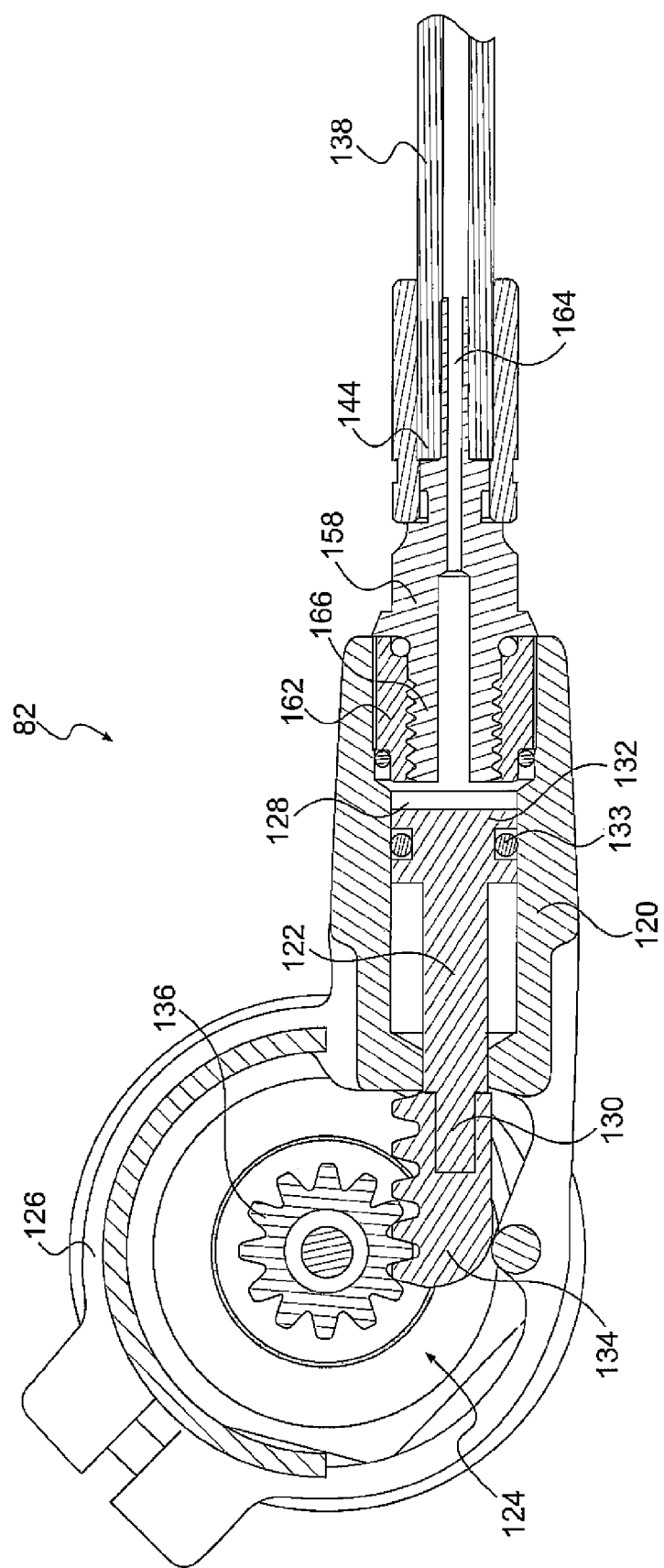
FIG. 8 is a cross-sectional view of the fluid responder of FIGS. 6 and 7.

Looking to FIGS. 6-8, the fluid responder 82 includes a second housing 120, a second piston 122 and a second actuator 124. The second housing 120 is mountable to a cap 115 of the bicycle suspension 12 by a clamp 126. The second housing 120 includes a second fluid cavity 128 for slidably receiving the second piston 122 therein and a second fill hole 117 for inserting fluid into the fluid cavity 128. A sealing screw 119 is threaded into the second fill hole 117. The second piston 122 includes first and second ends 130, 132. The second piston 122 is slidably displaceable between a first position and a second position. The first position corresponds to the substantially compressible suspension setting and the second position corresponds to the substantially rigid suspension setting. The first end 130 of the second piston 122 is connected to the second actuator 124 and the second end 132 includes an O-ring 133 to sealably connect the second end 132 of the second piston 122 to the second housing 120. The second actuator 124 includes a rack and pinion mechanism, a rack 134 or linear gear connected to the first end 130 of the second piston 122 engaging a pinion gear 136 attached to the driver 52 of the lockout mechanism 48 of the bicycle suspension 12. A spring 125 rotatably biases the driver 52 to bias the second piston 122 toward its first position.

The fluid path 84 includes the first and second fluid cavities 94, 128 and a flexible connector, in this embodiment a hydraulic hose 138, extending therebetween. One end 140 of the hydraulic hose 138 is connected to the fluid pump 80 through a first connector assembly 142 and the other end 144 of the hydraulic hose 138 is connected to the fluid responder 82 through a second connector assembly 146. The first connector assembly 142 includes a hose barb 148 having a first end 154 inserted into the end 140 of the hose 138 and a second end 156 connected to the first housing 86 of the fluid pump 80. The second connector assembly 146 includes a hose barb 158 and a threaded insert 162. One end 164 of the hose barb 158 is inserted into the end 144 of the hydraulic hose 138. The other end 166 of the hose barb 158 is threaded into the threaded insert 162 which is threaded into the second housing 120 of the fluid responder 82. A first O-ring 172 provides a seal between the hose barb 158 and the threaded insert 162. A second O-ring 174 provides a seal between the threaded insert 162 and the second housing 120. The fluid path 84 is discontiguous from the damping system 24 of the bicycle suspension 12.

To operate the bicycle suspension 12 between the first and second suspension settings, the push-button 106 is pushed to slidably displace the first piston 88 within the first fluid cavity 94 toward an open end 168 of the first fluid cavity 94 into its second position, causing the fluid to be displaced through the hydraulic hose 138 toward the fluid responder 82. The displaced fluid then slidably displaces the second piston 122 within the second fluid cavity 128 into its second position, causing the rack 134 to rotate the pinion gear 136, in turn, rotating the driver 52 of the damping system 24. Upon rotation of the driver 52, the valve 62 rotates to close the orifice 36 thereby locking the suspension 12, in this embodiment. To unlock the suspension 12, the push-button 106 is once again pushed to release the locking element 108, thereby permitting the biased driver 52 to bias the second piston 122 toward its first position, the displacement of the second piston 122 toward its first position displaces fluid through the hydraulic hose 138 to, in turn, displace the first piston 88 toward its first position.

While this invention has been described by reference to a particular embodiment, it should be understood that numerous changes could be made within the spirit and scope of the inventive concepts described. Accordingly, it is intended that the invention not be limited to the disclosed embodiment, but that it have the full scope permitted by the language of the following claims.

What is claimed:

1. A bicycle suspension system comprising:
    a bicycle suspension operable between first and second suspension settings; and
    a hydraulic control assembly including:
        a fluid pump mountable to a bicycle handlebar,
        a fluid responder mountable to the bicycle suspension, and
        a fluid path linking the fluid pump and the fluid responder,
        the fluid responder operatively connected to the bicycle suspension to operate the bicycle suspension between the first and second suspension settings in response to fluid displacement between the fluid pump and the fluid responder,
        wherein the bicycle suspension includes a damping system, the fluid path discontiguous from the damping system,
        wherein the fluid path includes a flexible connector between the fluid pump and the fluid responder,
        wherein the fluid pump includes a first housing having a first fluid cavity, a first piston slidably disposed in the fluid cavity and a first actuator operatively connected to the first piston for displacing the first piston within the first fluid cavity,
        wherein the fluid responder includes a second housing having a second fluid cavity, a second piston slidably disposed in the second fluid cavity and a second actuator operatively connected to the second piston for operating the bicycle suspension in response to displacement of the second piston within the second fluid cavity,
        wherein the second actuator includes a rack and pinion mechanism.

2. The bicycle suspension system of claim 1 wherein the first actuator and the first housing include a push-push toggle mechanism.

* * * * *